(12) United States Patent
Cho

(10) Patent No.: US 10,335,668 B2
(45) Date of Patent: Jul. 2, 2019

(54) ELECTRIC VEHICLE AND METHOD FOR CONTROLLING ELECTRIC VEHICLE

(71) Applicant: Kai-Han Cho, Taichung (TW)

(72) Inventor: Kai-Han Cho, Taichung (TW)

( * ) Notice: Subject to any disclaimer, the term of this patent is extended or adjusted under 35 U.S.C. 154(b) by 0 days.

(21) Appl. No.: 16/011,611

(22) Filed: Jun. 18, 2018

(65) Prior Publication Data

US 2018/0361226 A1 Dec. 20, 2018

(30) Foreign Application Priority Data

Jun. 19, 2017 (TW) .............................. 106120417 A

(51) Int. Cl.
| | | |
|---|---|---|
| A63C 17/12 | (2006.01) | |
| A63C 17/00 | (2006.01) | |
| B62K 3/00 | (2006.01) | |
| A63C 17/01 | (2006.01) | |
| B60L 50/20 | (2019.01) | |

(52) U.S. Cl.
CPC .......... *A63C 17/12* (2013.01); *A63C 17/0006* (2013.01); *A63C 17/0033* (2013.01); *A63C 17/011* (2013.01); *B60L 50/20* (2019.02); *B62K 3/002* (2013.01); *A63C 2203/12* (2013.01); *A63C 2203/14* (2013.01); *A63C 2203/18* (2013.01); *A63C 2203/24* (2013.01); *B62K 2204/00* (2013.01)

(58) Field of Classification Search
CPC . A63C 17/12; A63C 17/0006; A63C 17/0033; A63C 17/011; A63C 2203/12; A63C 2203/14; A63C 2203/18; A63C 2203/24; B60L 50/20; B62K 3/002; B62K 2204/00

USPC ..................................................... 280/11.115
See application file for complete search history.

(56) References Cited

U.S. PATENT DOCUMENTS

| | | | | |
|---|---|---|---|---|
| 7,138,774 | B2* | 11/2006 | Negoro .............. | A63C 17/0046 318/139 |
| 7,198,280 | B2* | 4/2007 | Hara .................. | A63C 17/0033 280/29 |
| 9,393,483 | B2* | 7/2016 | Tan ........................ | A63C 17/12 |
| 9,682,309 | B2* | 6/2017 | Huang .................... | A63C 17/12 |

(Continued)

FOREIGN PATENT DOCUMENTS

| CN | 106043569 A | 10/2016 |
|---|---|---|
| CN | 205931066 U | 2/2017 |

(Continued)

*Primary Examiner* — John D Walters
(74) *Attorney, Agent, or Firm* — CKC & Partners Co., LLC

(57) ABSTRACT

An electric vehicle includes a carrier, a free-wheel unit, a foot-wheel unit, a driving unit, a first angle-detecting unit and a micro processing unit. The carrier is for supporting a user. The free-wheel unit is disposed at one end of the carrier. The foot-wheel unit is disposed at the other end of the carrier. The driving unit is disposed at the free-wheel unit or the foot-wheel unit, and is for providing a power to the electric vehicle. The first angle-detecting unit is disposed at the free-wheel unit or the carrier, and is for detecting a swinging status between the free-wheel unit and the carrier so as to provide a swinging signal. The micro processing unit is signally connected to the driving unit and the first angle-detecting unit. When the swinging signal achieves a predetermined condition determined by the micro processing unit, the driving unit is turned on.

12 Claims, 7 Drawing Sheets

(56) References Cited

U.S. PATENT DOCUMENTS

2016/0067588 A1 3/2016 Tan et al.
2016/0144267 A1 5/2016 Huang

FOREIGN PATENT DOCUMENTS

| EP | 3083384 A1 | 10/2016 |
| KR | 101703940 B1 | 2/2017 |
| TW | I554314 B | 10/2016 |
| TW | M548011 U | 9/2017 |

* cited by examiner

ELECTRIC VEHICLE AND METHOD FOR CONTROLLING ELECTRIC VEHICLE

RELATED APPLICATIONS

This application claims priority to Taiwan Application Serial Number 106120417, filed Jun. 19, 2017, which is herein incorporated by reference.

BACKGROUND

Technical Field

The present disclosure relates to an electric vehicle. More particularly, the present disclosure relates to an electric vehicle which an output power is turned on by swinging and a method for controlling an electric vehicle.

Description of Related Art

Skateboards and caster boards are popular among modern young people, especially caster boards. A caster board has a front pedal, a rear pedal and a torque plate that connects the front pedal and the rear pedal. The front pedal and the rear pedal can be swung relative to the torque plate, hence the user can control the front pedal and the rear pedal to swing in opposite directions, so as to generate power for moving forward.

To improve the performance of the caster board, some vendors dispose motors and batteries on the front pedal and the rear pedal, wherein the batteries supply power to the motors, and the motors drive the front pedal or the rear pedal to move and thus electric power is supplied to the caster board.

However, the aforementioned caster board is often turned on via a switch on the pedal or via remote controlling by the user. Therefore, the operation thereof is inconvenient.

Therefore, how to effectively improve the controlling structure of electric vehicles such as caster boards to make them more convenient to control has become an objective of effort in the related industry.

SUMMARY

According to one aspect of the present disclosure an electric vehicle includes a carrier, a free-wheel unit, a foot-wheel unit, a driving unit, a first angle-detecting unit, a micro processing unit and a voice prompting unit. The carrier is for supporting a user. The free-wheel unit is disposed at one end of the carrier. The foot-wheel unit is disposed at the other end of the carrier. The driving unit is disposed at one of the free-wheel unit and the foot-wheel unit, and is for providing a power to the electric vehicle. The first angle-detecting unit is disposed at one of the free-wheel unit and the carrier, and is for detecting a swinging status between the free-wheel unit and the carrier so as to provide a swinging signal. The micro processing unit is signally connected to the driving unit and the first angle-detecting unit. The voice prompting unit is disposed at the carrier and electrically connected to the micro processing unit. When the swinging signal achieves a predetermined condition which is determined by the micro processing unit, the driving unit is turned on.

According to another aspect of the present disclosure, a method for controlling an electric vehicle is provided, wherein the electric vehicle includes a carrier, a free-wheel unit, a foot-wheel unit, a driving unit, a first angle-detecting unit and a micro processing unit. The free-wheel unit and the foot-wheel unit are disposed at two ends opposite to each other of the carrier, respectively. The driving unit is disposed at one of the free-wheel unit and the foot-wheel unit, and is for providing a power to the electric vehicle. The first angle-detecting unit is disposed at the free-wheel unit, and is signally connected to the micro processing unit. The method for controlling the electric vehicle includes that standing on the carrier; and operating a power starting procedure, wherein when the electric vehicle goes straight, the free-wheel unit is swung so as to cause the first angle-detecting unit to send a swinging signal to the micro processing unit for turning on the driving unit.

According to further another aspect of the present disclosure, a method for controlling an electric vehicle is provided, wherein the electric vehicle includes a carrier, a free-wheel unit, a foot-wheel unit, a driving unit, a first angle-detecting unit and a micro processing unit. The free-wheel unit and the foot-wheel unit are disposed at two ends opposite to each other of the carrier, respectively. The driving unit is disposed at one of the free-wheel unit and the foot-wheel unit, and is for providing a power to the electric vehicle. The first angle-detecting unit is disposed at the free-wheel unit, and is signally connected to the micro processing unit. The method for controlling the electric vehicle includes that standing on the carrier; and swinging the free-wheel unit to cause the first angle-detecting unit to send a swinging signal to the micro processing unit for controlling a starting, a power magnitude switching or a power lasting time of the driving unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
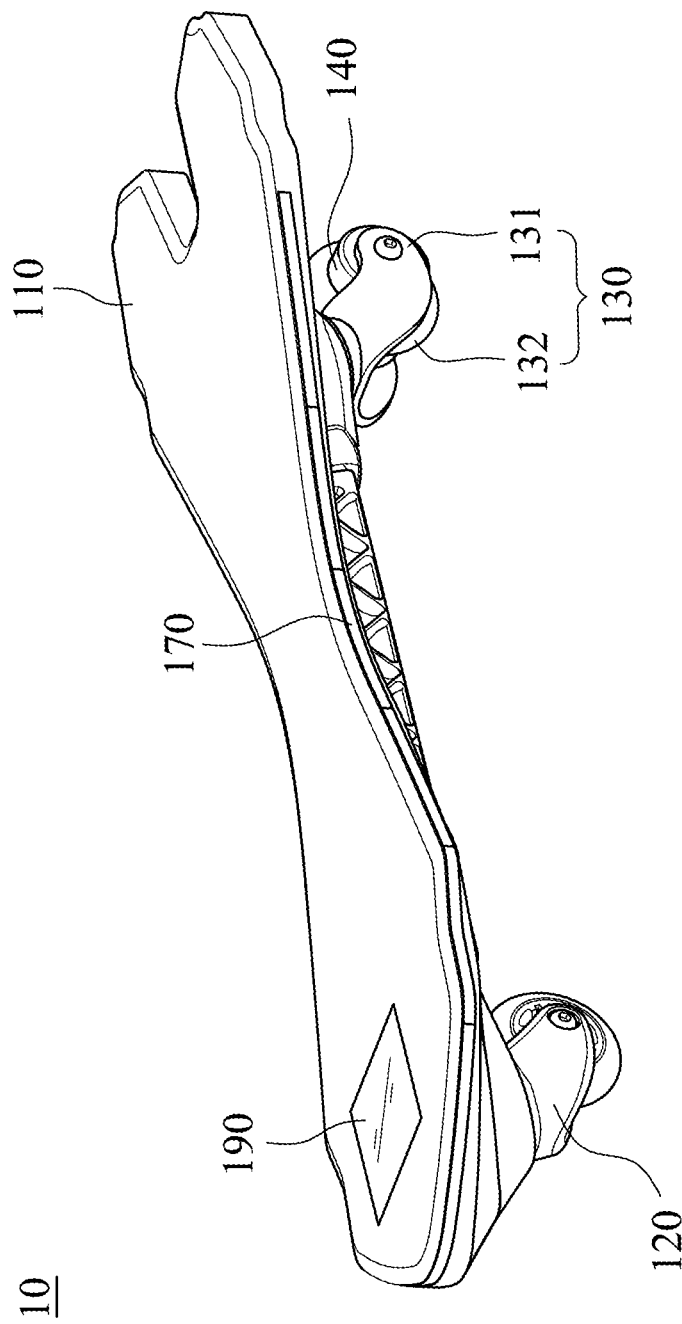
FIG. 1 is a three-dimensional schematic view of an electric vehicle according to one embodiment of the present disclosure.

The detailed description will be discussed with reference to the drawings in the following paragraphs. To explain specifically, many details of the practice will also be discussed in the following paragraphs. However, it should be understood that these details are not to limit the present disclosure. That is, these details of the practice are not necessary in some embodiments of the present disclosure. Furthermore, to simplify the drawings, some of the conventional structures and components will be illustrated in a simple manner, and the same components may be denoted by the same reference numerals.

Figure 2B:
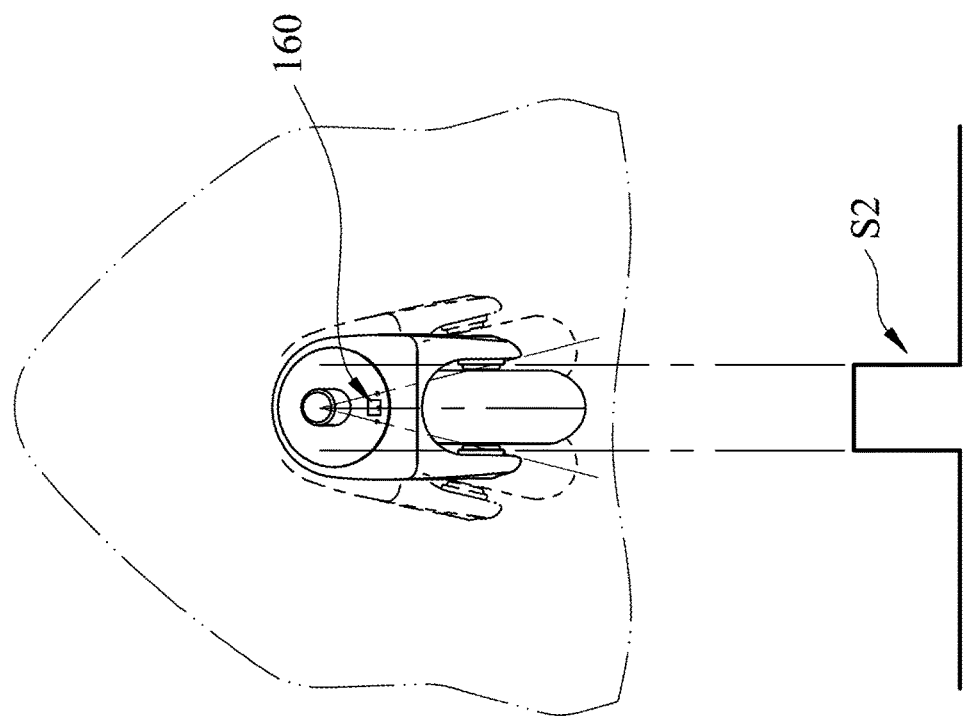
FIG. 2B is a schematic view of a foot-wheel unit, a second angle-detecting unit and a turning signal of the electric vehicle in FIG. 1.
Figure 2A:
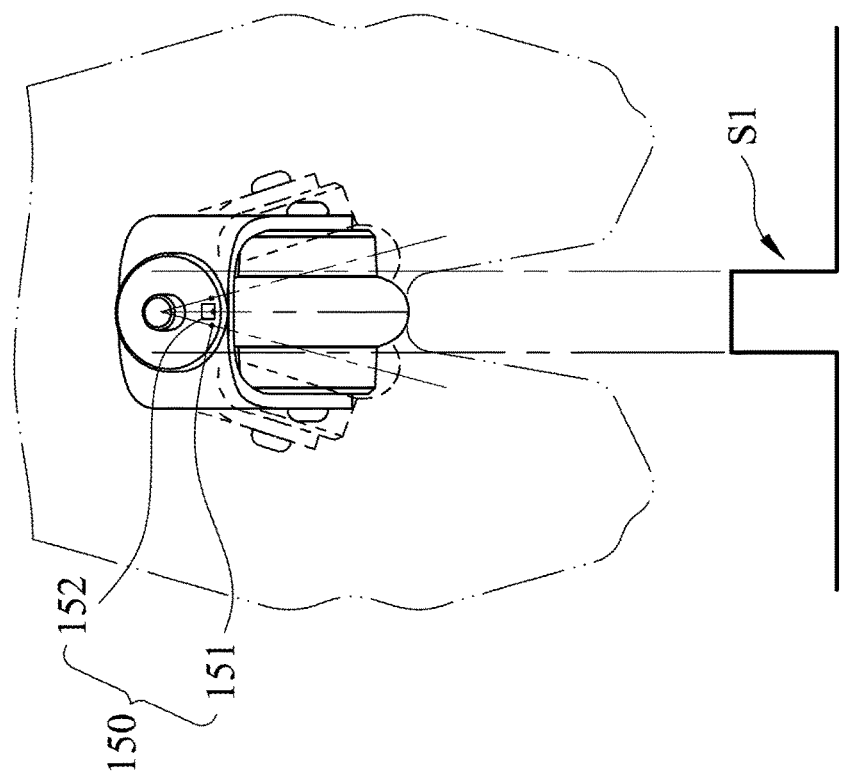
FIG. 2A is a schematic view of a free-wheel unit, a first angle-detecting unit and a swinging signal of the electric vehicle in FIG. 1.
Figure 3:
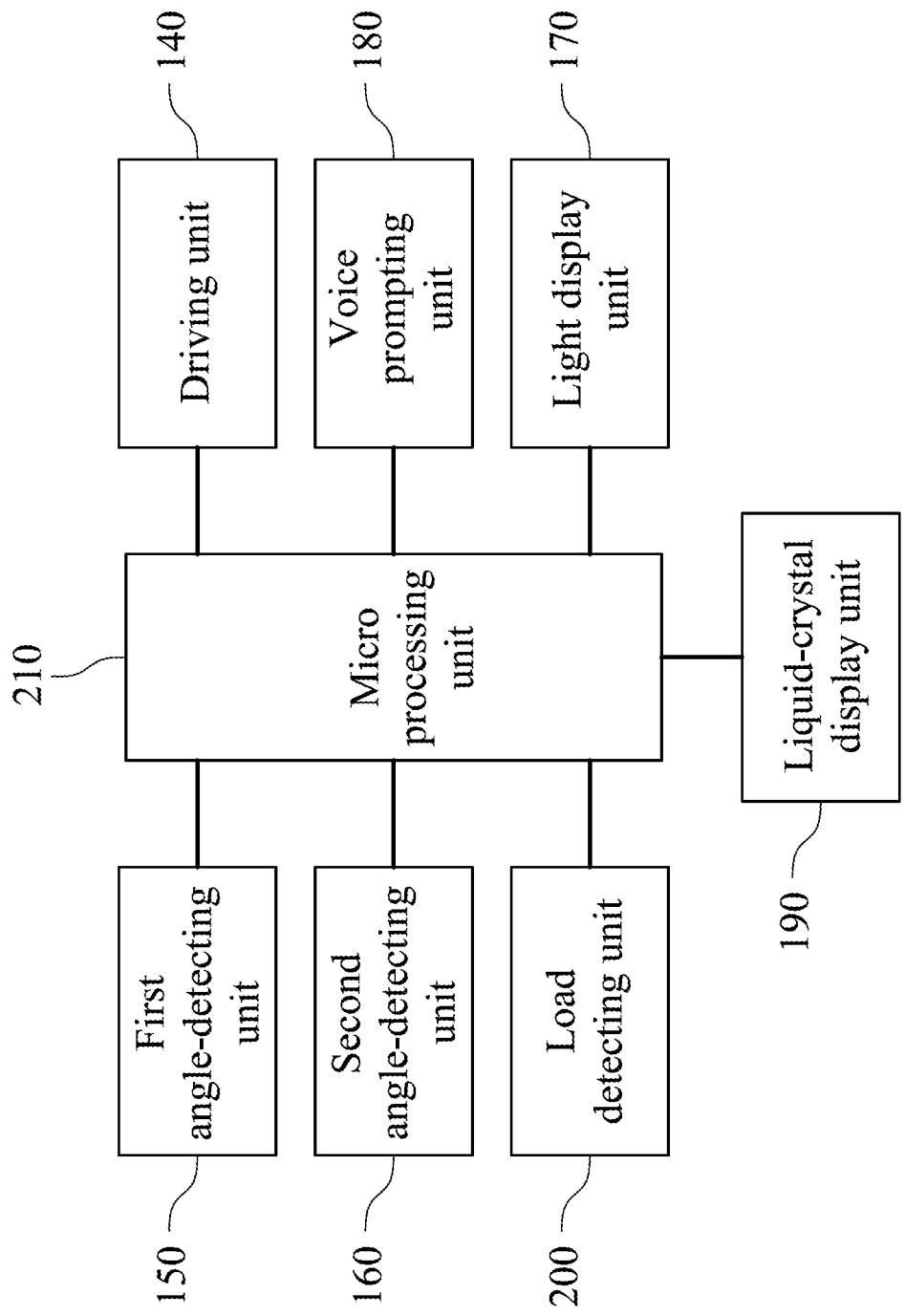
FIG. 3 is a system block diagram of the electric vehicle in FIG. 1.

Please refer to FIG. 1, FIG. 2A, FIG. 2B and FIG. 3, wherein FIG. 1 is a three-dimensional schematic view of an electric vehicle 10 according to one embodiment of the present disclosure, FIG. 2A is a schematic view of a free-wheel unit 130, a first angle-detecting unit 150 and a swinging signal S1 of the electric vehicle 10 in FIG. 1, FIG. 2B is a schematic view of a foot-wheel unit 120, a second angle-detecting unit 160 and a turning signal S2 of the electric vehicle 10 in FIG. 1, and FIG. 3 is a system block diagram of the electric vehicle 10 in FIG. 1. The electric vehicle 10 includes a carrier 110, the foot-wheel unit 120, the free-wheel unit 130, a driving unit 140, the first angle-detecting unit 150 and a micro processing unit 210. The carrier 110 is for supporting a user. The free-wheel unit 130 is disposed at one end of the carrier 110. The foot-wheel unit 120 is disposed at the other end of the carrier 110. The driving unit 140 is disposed at one of the free-wheel unit 130 and the foot-wheel unit 120 and is for providing power to the electric vehicle 10. The first angle-detecting unit 150 is disposed at one of the free-wheel unit 130 and the carrier 110 and is for detecting a swinging status between the free-wheel unit 130 and the carrier 110 so as to provide the swinging signal S1. The micro processing unit 210 is signally connected to the driving unit 140 and the first angle-detecting unit 150, wherein when the swinging signal S1 achieves a predetermined condition which is determined by the micro processing unit 210, the driving unit 140 is turned on.

As such, the first angle-detecting unit 150 can provide the swinging signal S1 to the micro processing unit 210 to determine, and the driving unit 140 can be turned on when the swinging signal S1 achieves the predetermined condition. Therefore, the user merely needs to swing the free-wheel unit 130 to turn on the power, so that the advantages of easy control and convenience can be provided. The structure and the operation of the electric vehicle 10 will be discussed in detail as follows.

In the embodiment of FIG. 1, the electric vehicle 10 may be a caster board. The free-wheel unit 130 includes a frame 131 and a wheel 132. The frame 131 is pivotally disposed on the carrier 110 and can rotate relative to the carrier 110, and the wheel 132 is pivotally disposed on the frame 131. When the frame 131 is rotated, an angle between an axis of the wheel 132 and the carrier 110 will be changed.

In the embodiment of FIG. 1, the structure of the foot-wheel unit 120 is similar to the structure of the free-wheel unit 130. That is, an angle between an axis of the foot-wheel unit 120 and the carrier 110 can be changed. However, in other embodiments, the angle between the axis of the foot-wheel unit 120 and the carrier 110 may be fixed and will not change with the rotation of the foot-wheel unit 120, but the present disclosure will not be limited thereto.

The driving unit 140 includes a hub motor which may be disposed in the wheel 132 of the free-wheel unit 130 so as to directly drive the wheel 132 to rotate. In other embodiments, the driving unit 140 may also include a motor and a linkage module, the linkage module can be driven by the motor for linking up with the wheel 132 to rotate; or, the driving unit 140 may also be disposed on the foot-wheel unit 120, but the present disclosure will not be limited thereto.

The first angle-detecting unit 150 may be a magnetic detector which includes an induced magnet 151 and a Hall chip 152, wherein the Hall chip 152 is disposed on a side facing the free-wheel unit 130 of the carrier 110, and the induced magnet 151 is disposed on an outer surface facing the carrier 110 of the frame 131 and is opposite to the Hall chip 152. In other embodiments, the positions of the induced magnet 151 and the Hall chip 152 may be interchangeable as long as the Hall chip 152 can correspond to the induced magnet 151 so as to detect the swinging status.

The swinging signal S1 sent by the first angle-detecting unit 150 is a pulse wave signal. When the Hall chip 152 detects the induced magnet 151, the signal will rise from a lower level to a higher level and a pulse wave is generated (or fall from a higher lever to a lower level, depending on the specification of the Hall chip 152). That is, when the free-wheel unit 130 is swung continuously in a time period, the swinging signal S1 will generate several continuous pulse waves. Therefore, after the micro processing unit 210 receives the swinging signal S1, the swinging status of the free-wheel unit 130 can be determined by the generated number or the generated time period of the pulse waves, and the driving unit 140 is turned on when the swinging status achieves a predetermined condition. For example, the predetermined condition is that the speed of the electric vehicle 10 is lower than 4 kilometers per hour and the swinging speed (the generated number of the pulse waves per second) reaches twice per second. Therefore, as long as the swinging signal S1 received and determined by the micro processing unit 210 achieves the predetermined condition above, the driving unit 140 will be turned on. In other embodiments, the predetermined condition may be that the speed of the electric vehicle is higher than 4 kilometers per hour and the swinging speed reaches once per second; or, the criteria for determining may be the seconds that the pulse waves last. For example, the predetermined condition is that the speed of the electric vehicle 10 is lower than 4 kilometers per hour and it is required that pulse waves are generated continuously in 4 seconds; or, the predetermined condition is that the speed of the electric vehicle 10 is higher than 4 kilometers per hour and it is required that pulse waves are generated continuously in 2 seconds. The predetermined condition may contain the above disclosures but is not limited thereto.

The electric vehicle 10 may further includes a second angle-detecting unit 160, wherein the second angle-detecting unit 160 is disposed at the foot-wheel unit 120 and is for detecting the swinging status between the foot-wheel unit 120 and the carrier 110 so as to provide a turning signal S2, and the micro processing unit 210 is for determining whether the electric vehicle 10 turns or goes straight according to the turning signal S2. The second angle-detecting unit 160 can detect the swinging status between the foot-wheel unit 120 and the carrier 110. The structure of the second angle-detecting unit 160 is the same as the structure of the first angle-detecting unit 150, and the generating principle of the turning signal S2 is the same as the generating principle of the swinging signal S1, thus the detail of the structure second angle-detecting unit 160 and the generating principle of the turning signal S2 will not be described again herein. Therefore, after the micro processing unit 210 receives the turning signal S2, the moving status of the electric vehicle 10 can be determined by the generated number or the generated time period of the pulse wave.

Since the swinging angles when every user turns are random, and the electric vehicle 10 can be controlled to go straight by swinging the angle of the foot-wheel unit 120, it is difficult to design the best swinging angle. In order to solve the problem, the micro processing unit 210 may include a timer. If the signal is at a lower level, the timer is started; otherwise, the timer is reset. It is determined that the electric vehicle 10 turns when the time of the timer is over a setting value, wherein the setting value may be set as 0.5 second.

In other embodiments, the first angle-detecting unit 150 or the second angle-detecting unit 160 may also include a photointerrupter or a reed switch as long as the signal level can be changed when the foot-wheel unit 120 or the free-wheel unit 130 is swung relative to the carrier 110, and thus the swinging status of the foot-wheel unit 120 or the free-wheel unit 130 can be obtained and determined by the micro processing unit 210, but the present disclosure will not be limited thereto.

In the embodiment of FIG. 1, the electric vehicle 10 may further include a liquid-crystal display unit 190 disposed on the carrier 110 and electrically connected to the micro processing unit 210. The liquid-crystal display unit 190 can display information such as the speed and the mileage of the electric vehicle 10, and can also display the swinging status of the free-wheel unit 130 calculated by the micro processing unit 210.

The electric vehicle 10 may further includes a voice prompting unit 180 disposed at the carrier 110 and electrically connected to the micro processing unit 210. The voice prompting unit 180 may be a buzzer which can prompt the user if the speed is too fast, the electric vehicle has abnormal warning, anti-theft (when the change of the signal of the angle or the rotation of the wheel is detected under anti-theft status), the system status, etc.

The electric vehicle 10 may further include a light display unit 170 disposed on the carrier 110 and electrically connected to the micro processing unit 210. The light display unit 170 may include several LEDs which are arranged in a line and embedded in the side of the carrier 110. Each LED can be turned on or off via the micro processing unit 210.

The electric vehicle 10 may further include a load detecting unit 200 which is disposed on the carrier 110 and is for detecting a load of the carrier 110. The load detecting unit 200 is signally connected to the micro processing unit 210. When the user stands on the carrier 110, the load detecting unit 200 will detect a weight. If the continuous time of the weight detected reaches a setting seconds, it will be determined that the user stands on the carrier 110 stably. Under this configuration, the load detecting unit 200 can be an assistant safe sensing device. For example, when the driving unit 140 continuously drives the electric vehicle 10 to move, the load detecting unit 200 can detect if the user is still using the electric vehicle 10. Since the user will not swing the free-wheel unit 130 after the free-wheel unit 130 is straightened, it cannot be determined whether the user stands stably. Therefore, if the user jump down the electric vehicle 10 and the load detecting unit 200 detects that there is no load on the carrier 110, the micro processing unit 210 will automatically stop the output from the driving unit 140 so as to prevent from danger.

Moreover, the micro processing unit 210 may further includes a Bluetooth receiver which is for receiving a Bluetooth signal to lock the driving unit 140. The Bluetooth signal can be sent from a cell phone and lock the driving unit 140 or unlock the driving unit 140. When the driving unit 140 is locked, the driving unit 140 cannot be turned on by any type of operation before the driving unit is unlocked.

Figure 4:
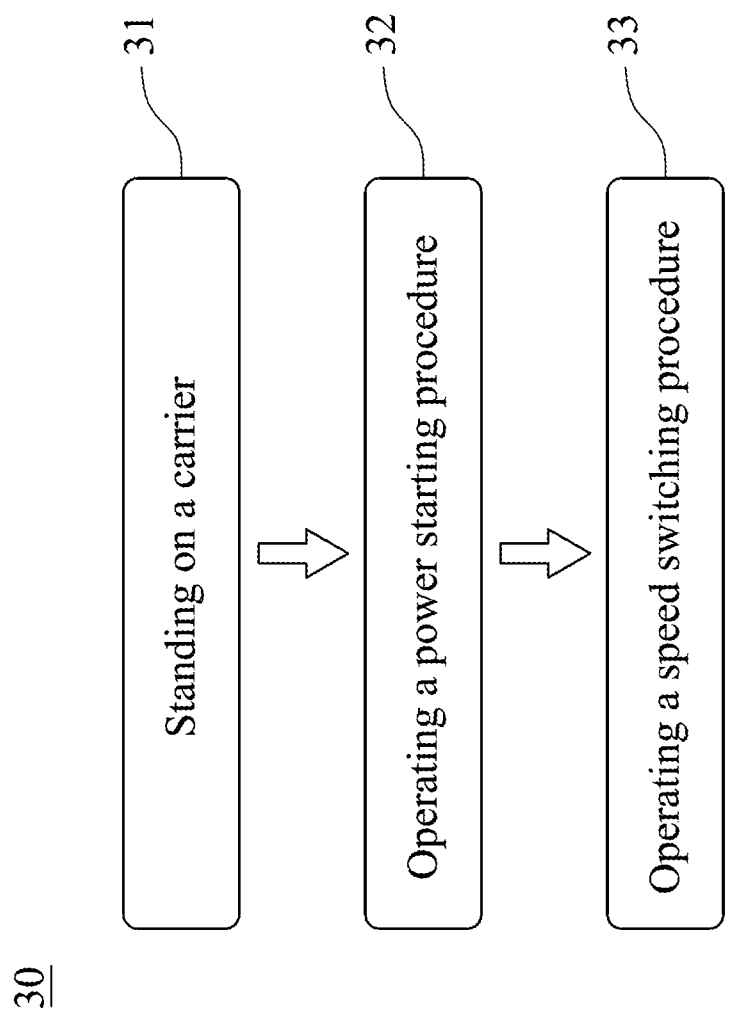
FIG. 4 is a flow chart of a method for controlling an electric vehicle according to another embodiment of the present disclosure.

Please refer to FIG. 4, and please also refer to FIG. 1, FIG. 2A, FIG. 2B and FIG. 3, wherein FIG. 4 is a flow chart of a method for controlling an electric vehicle 30 according to another embodiment of the present disclosure. The method for controlling the electric vehicle 30 includes step 31, step 32 and step 33.

In step 31, the user stands on the carrier 110. The load can be detected by the load detecting unit 200 of the electric vehicle 10 so as to send a loading signal while standing on the carrier 110. The loading signal is received by the micro processing unit 210, and the micro processing unit 210 can analyze the loading signal to determine if the user stands stably.

In step 32, a power starting procedure is operated. When the electric vehicle 10 goes straight, the user swings the free-wheel unit 130 to cause the first angle-detecting unit 150 to send the swinging signal S1 to the micro processing unit 210 for turning on the driving unit 140. As mentioned above, whether the electric vehicle 10 goes straight can be determined via analyzing the turning signal S2 by the micro processing unit 210, and whether the swinging signal S1 achieves the predetermined condition can be determined via analyzing the swinging signal S1 by the micro processing unit 210. If the electric vehicle 10 goes straight and the swinging signal achieves the predetermined condition, then the driving unit 140 is turned on.

As such, the user merely needs to stand on the carrier 110 and control the swinging of the free-wheel unit 130 by swinging legs so as to turn on the driving unit 140, hence the operation is very convenient. It should be noted that the driving unit 140 is allowed to be turned on only if the electric vehicle 10 goes straight and the swinging signal S1 achieves the predetermined condition.

In step 33, a speed switching procedure can be operated to swing the free-wheel 130 again to enhance the power from the driving unit 140. To be more specific, when the power starting procedure is operated to turn on the driving unit 140, the output power of the driving unit 140 can be changed by swinging again. For example, the power level of the driving unit 140 is circularly switched among weak, medium and strong, and the power of the driving unit 140 can be switched via continuous swinging of the free-wheel unit 130 by the user. When switching, the user can be prompted by the gradual display (the number of lighted LEDs) of the light display unit 170 or the gradual rising of the volume of the voice prompting unit 180, and thus the user can properly adjust the output power to a desired value when swinging the free-wheel unit 130.

Figure 5:
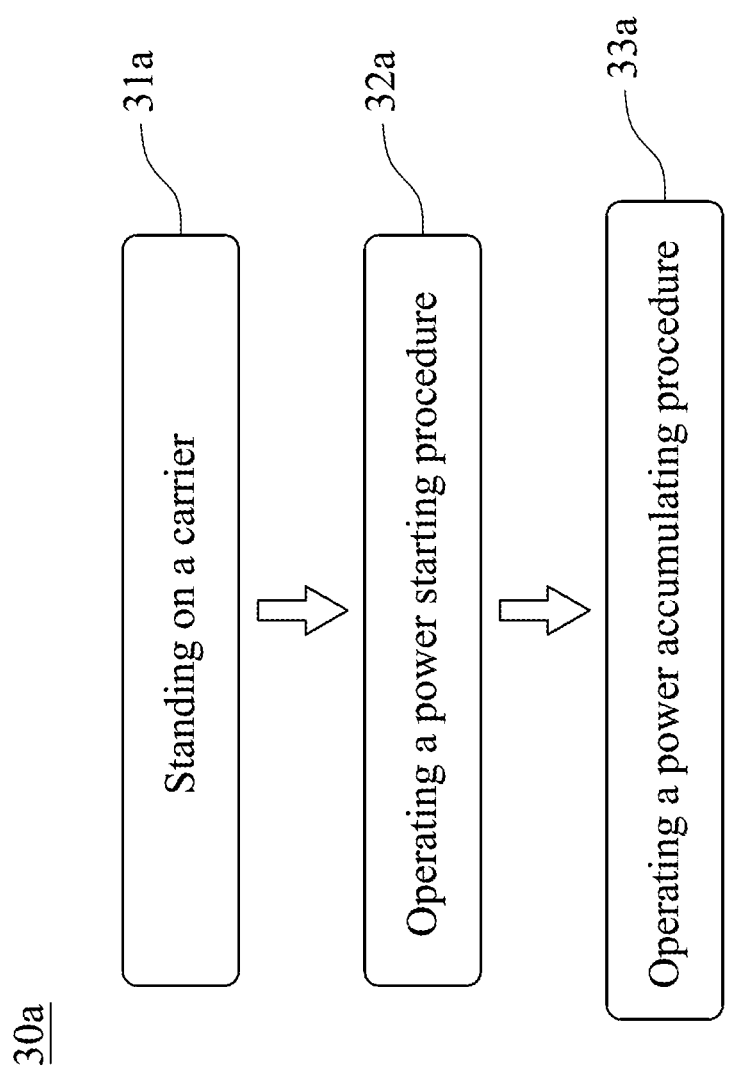
FIG. 5 is a flow chart of a method for controlling an electric vehicle according to further another embodiment of the present disclosure.

Please refer to FIG. 5, and please also refer to FIG. 1, FIG. 2A, FIG. 2B and FIG. 3, wherein FIG. 5 is a flow chart of a method for controlling an electric vehicle 30a according to further another embodiment of the present disclosure. The method for controlling the electric vehicle 30a includes step 31a, step 32a and step 33a.

Step 31a and step 32a are similar to step 31 and step 32 in FIG. 4. In step 33a, a power accumulating procedure is operated and the free-wheel unit 130 is swung again to accumulate a starting time of the driving unit 140. That is, the driving unit 140 will not remain in the output state after being turned on; instead, the free-wheel unit 130 needs to be continuously swung to accumulate the output seconds of the driving unit 140. For example, 2 seconds of the output time of the power is accumulated with each swing, and the user can be prompted the output time accumulated so far by the gradual display (the number of lighted LEDs) of the light display unit 170 or the gradual rising of the volume of the voice prompting unit 180. When the desired output seconds of the power is reached, the assistant power of the motor of the accumulated time can be outputted after the motor wheel straightens.

It should be noted that the swinging signal S1 needs to achieve the predetermined condition when swinging, and then the swing will be determined as an effective swing; otherwise, the swing will be determined as merely a small swing when the electric vehicle 10 moves.

The method for controlling the electric vehicle 30 can be a using mode when the electric vehicle 10 travels on general roads. Thus, a stable propulsive power is given, and the magnitude of the output power can be changed depending on whether the electric vehicle 10 travels on an uphill or a downhill or what the road status is. The method for controlling the electric vehicle 30a can be a using mode when the electric vehicle 10 is in a race. When the speed of swinging of the free-wheel unit 130 is fast and the number of the accumulated seconds is large, a propulsive power of longer time can be provided to ensure that the user is leading the race. This mode brings more fun comparing to a continuous assistant power and is favorable to make the electric vehicle 10 become a fashion by constant racing and promotion among people. Moreover, users of different ages can race together, and the users can exercise their own bodies.

Furthermore, when the electric vehicle 10 has various options of power control, the method for controlling the electric vehicle may include that standing on the carrier 110; and a swinging signal S1 is sent by the first angle-detecting unit 150 to the micro processing unit 210 for controlling the starting time, the power magnitude switching time or the power lasting time of the driving unit when swinging the free-wheel unit 130. As such, the user can control various options of power output by merely swinging legs.

Figure 6:
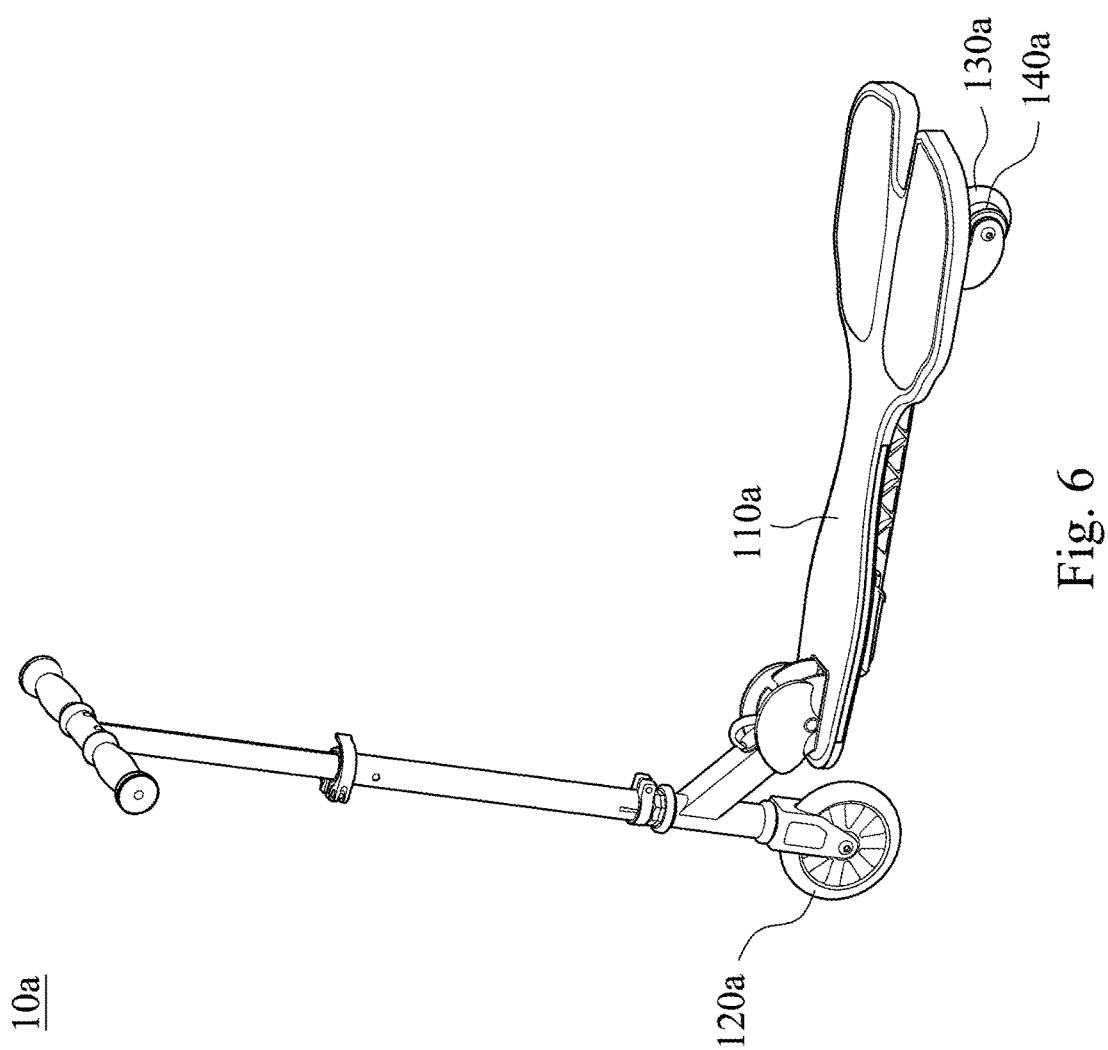
FIG. 6 is a three-dimensional schematic view of an electric vehicle according to still another embodiment of the present disclosure.

Please refer to FIG. 6, which is a three-dimensional schematic view of an electric vehicle 10a according to still another embodiment of the present disclosure. The electric vehicle 10a is a single-wheeled scooter, wherein a foot-wheel unit 120a is disposed at the front end of a carrier 110a, a free-wheel unit 130a is disposed at the rear end of the carrier 110a, and a driving unit 140a is disposed on the free-wheel unit 130a. In the embodiment of FIG. 6, the foot-wheel unit 120a is a fixed wheel and cannot be swung relative to the carrier 110a. Other structures and operations are the same as the structures and operations of FIG. 1 to FIG. 5 as above.

Figure 7:
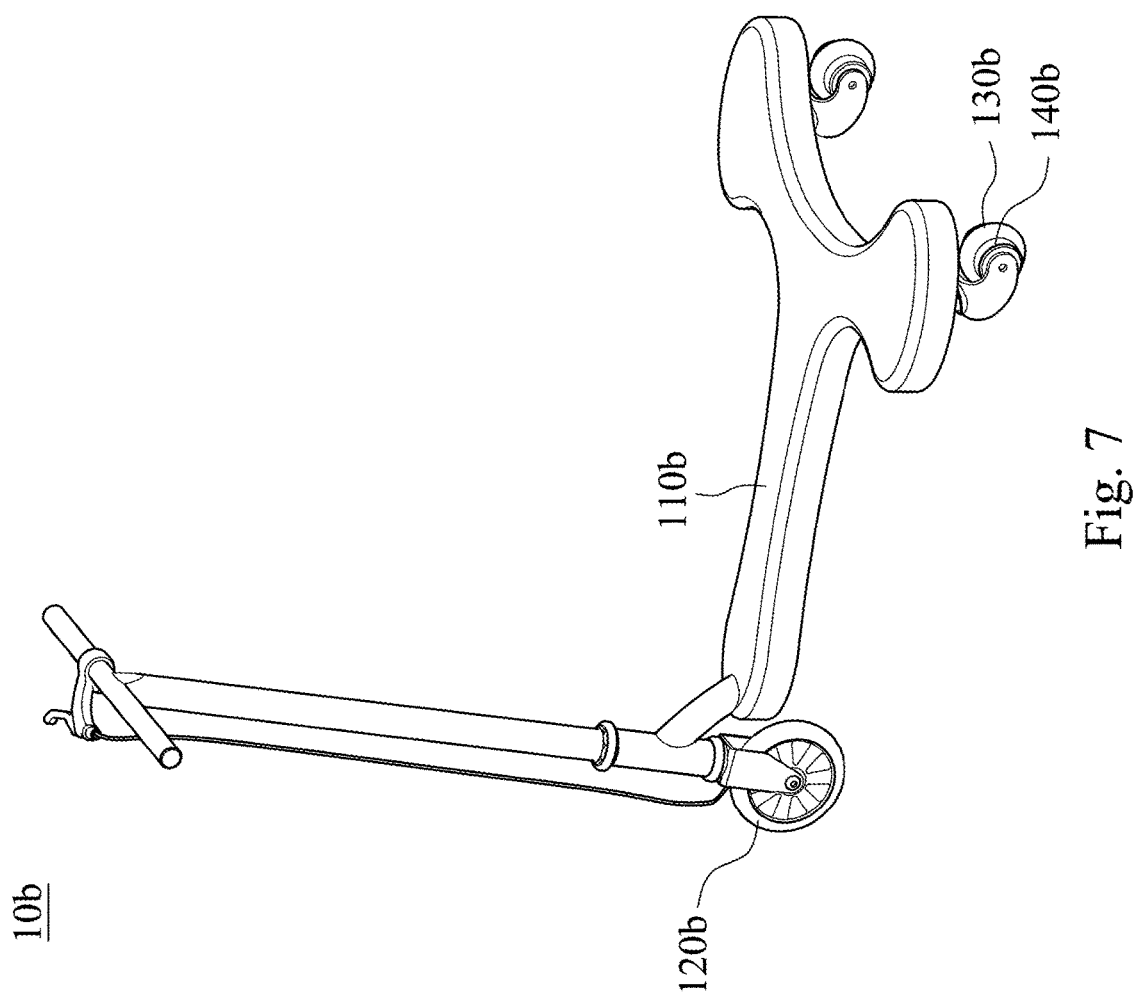
FIG. 7 is a three-dimensional schematic view of an electric vehicle according to yet another embodiment of the present disclosure.

Please refer to FIG. 7, which is a three-dimensional schematic view of an electric vehicle 10b according to yet another embodiment of the present disclosure. The electric vehicle 10b is a two-wheeled scooter, wherein a foot-wheel unit 120b is disposed at the front end of a carrier 110b, the number of free-wheel units 130b is two and the free-wheel units 130b are disposed at the rear end of the carrier 110b, and the number of driving units 140b is also two and the driving units 140b are disposed on each of the free-wheel units 130b, respectively. In the embodiment of FIG. 7, the foot-wheel unit 120b is a fixed wheel and cannot be swung relative to the carrier 110b. At least one first angle-detecting unit 150 is disposed on one of the free-wheel unit 130b so as to detect the swinging status. Since the direction of the two free-wheel units 130b is swung with the center of weight of the user, the swinging directions are the same, and thus only one first angle-detecting unit 150 is required to be disposed at one of the free-wheel units 130b. Certainly, in other embodiments, two first angle-detecting units 150 may also be disposed on each of the free-wheel units 130b, respectively, and other structures and operations are the same as the structures and operations of FIG. 1 to FIG. 5 as above.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electric vehicle, comprising:
   a carrier for supporting a user;
   a free-wheel unit disposed at one end of the carrier;
   a foot-wheel unit disposed at the other end of the carrier;
   a driving unit disposed at one of the free-wheel unit and the foot-wheel unit, and for providing a power to the electric vehicle;
   a first angle-detecting unit disposed at one of the free-wheel unit and the carrier, the first angle-detecting unit for detecting a swinging status between the free-wheel unit and the carrier so as to provide a swinging signal;
   a micro processing unit signally connected to the driving unit and the first angle-detecting unit; and
   a voice prompting unit disposed at the carrier and electrically connected to the micro processing unit;
   wherein when the swinging signal achieves a predetermined condition which is determined by the micro processing unit, the driving unit is turned on.

2. The electric vehicle of claim 1, wherein the micro processing unit comprises a Bluetooth receiver for receiving a Bluetooth signal so as to lock the driving unit.

3. The electric vehicle of claim 1, further comprising:
   a liquid-crystal display unit disposed on the carrier and electrically connected to the micro processing unit.

4. The electric vehicle of claim 1, further comprising:
   a light display unit disposed on the carrier and electrically connected to the micro processing unit.

5. The electric vehicle of claim 1, further comprising:
   a second angle-detecting unit disposed at the foot-wheel unit and for detecting a swinging status between the foot-wheel unit and the carrier so as to provide a turning signal, and the micro processing unit is for determining whether the electric vehicle turns or goes straight according to the turning signal.

6. The electric vehicle of claim 1, further comprising:
   a load detecting unit disposed on the carrier and for detecting a load of the carrier.

7. A method for controlling an electric vehicle, the electric vehicle comprising a carrier, a free-wheel unit, a foot-wheel unit, a driving unit, a first angle-detecting unit and a micro processing unit, wherein the free-wheel unit and the foot-wheel unit are disposed at two ends opposite to each other of the carrier, respectively, the driving unit is disposed at one of the free-wheel unit and the foot-wheel unit and is for providing a power to the electric vehicle, the first angle-detecting unit is disposed at the free-wheel unit and is signally connected to the micro processing unit, and the method for controlling the electric vehicle comprising:
   standing on the carrier; and
   operating a power starting procedure, wherein when the electric vehicle goes straight, the free-wheel unit is swung so as to cause the first angle-detecting unit to send a swinging signal to the micro processing unit for turning on the driving unit.

8. The method for controlling the electric vehicle of claim 7, wherein in the power starting procedure, a second angle-detecting unit of the electric vehicle detects a swinging status between the foot-wheel unit and the carrier to provide a turning signal, and the micro processing unit determines whether the electric vehicle goes straight according to the turning signal.

9. The method for controlling the electric vehicle of claim 7, wherein a load is detected by a load detecting unit of the electric vehicle so as to send a loading signal while standing on the carrier.

10. The method for controlling the electric vehicle of claim 7, further comprising:
operating a speed switching procedure, wherein the free-wheel unit is swung again to enhance the a power to the electric vehicle provided by the driving unit.

11. The method for controlling the electric vehicle of claim 7, further comprising:
operating a power accumulating procedure, wherein the free-wheel unit is swung again to accumulate a starting time of the driving unit.

12. A method for controlling an electric vehicle, the electric vehicle comprising a carrier, a free-wheel unit, a foot-wheel unit, a driving unit, a first angle-detecting unit and a micro processing unit, wherein the free-wheel unit and the foot-wheel unit are disposed at two ends opposite to each other of the carrier, respectively, the driving unit is disposed at one of the free-wheel unit and the foot-wheel unit and is for providing a power to the electric vehicle, the first angle-detecting unit is disposed at the free-wheel unit and is signally connected to the micro processing unit, and the method for controlling the electric vehicle comprises:
standing on the carrier; and
swinging the free-wheel unit to cause the first angle-detecting unit to send a swinging signal to the micro processing unit for controlling a starting, a power magnitude switching or a power lasting time of the driving unit.

* * * * *